United States Patent
Hsuan

(10) Patent No.: US 7,154,872 B2
(45) Date of Patent: Dec. 26, 2006

(54) METHOD AND SYSTEM FOR TRACKING AND CORRECTING TIMING ERRORS IN COMMUNICATION SYSTEMS

(75) Inventor: Yi Hsuan, Whippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 986 days.

(21) Appl. No.: 10/132,454

(22) Filed: Apr. 26, 2002

(65) Prior Publication Data

US 2003/0202488 A1  Oct. 30, 2003

(51) Int. Cl.
*H04B 7/216* (2006.01)

(52) U.S. Cl. ............... 370/335; 370/342; 375/150

(58) Field of Classification Search .............. None
See application file for complete search history.

(56) References Cited

U.S. PATENT DOCUMENTS

| | | | |
|---|---|---|---|
| 6,269,075 B1 * | 7/2001 | Tran | 370/206 |
| 6,735,242 B1 * | 5/2004 | Kenney et al. | 375/150 |
| 2004/0165655 A1 * | 8/2004 | Rick et al. | 375/148 |

* cited by examiner

*Primary Examiner*—Duc Ho

(57) ABSTRACT

In the method, a detector retrieves certain signal samples from a data frame that are accumulated in a buffer of a base station receiver. The detector generates a first metric representing a first signal sample and a second metric representing a second signal sample, and calculates a sum of the first and second metrics and a difference between the first and second metrics. A calculator uses the sum to calculate at least one threshold value, and a comparator compares the difference to the calculated threshold value to determine an on-time error for the frame. Based on the determined on-time error, an adjuster adjusts timing for the on-time error, and feeds back an on-time error correction to the buffer for subsequently received data frames.

26 Claims, 5 Drawing Sheets ns/chip for each frame of data from sample buffer 105 and, via a filtering action performed in interpolator 110, increases the resolution to output samples of a frame at a rate of 16 samples/chip. These samples collect in a circular buffer 120 until samples for an entire frame of data have been stored in circular buffer 120.

METHOD AND SYSTEM FOR TRACKING AND CORRECTING TIMING ERRORS IN COMMUNICATION SYSTEMS

BACKGROUND OF THE INVENTION

1. Field of the Invention

The present invention generally relates to communications systems and more particularly to a method and system for improving tracker performance in code division multiple access (CDMA) communication systems.

2. Description of Related Art

The IS-95 standard defines features of what is frequently called a second generation code division multiple access (CDMA) communication system, a type of Direct Sequence spread spectrum modulation. An IS-95 system communicates information from a base station to mobile stations over a series of traffic channels. These traffic channels transmit and receive information, spread with a traffic channel pseudonoise (PN) code, unique to each mobile station. Using precise timing and phase information derived from a pilot channel, the mobile station is able to acquire a setup channel, and eventually, the overall system time. With this system time, the mobile station is able to differentiate between base stations and synchronize its demodulation circuitry with sufficient accuracy to recover the received traffic channel message.

In a third-generation Universal Mobile Telecommunication System (UMTS), base stations are not closely synchronized. Although mobile stations attempt to lock the base station carrier frequency, the operation is imperfect such that a frequency offset is present between a mobile station and a corresponding base station. The frequency offset becomes more obvious when the mobile station is in a handoff mode (a handoff mode is where a mobile station talks to two unsynchronized base stations) or the mobile station moves at a higher speed, which causes higher Doppler frequency. Without performing some type of timing error correction, an on-time error in a base station receiver can increase with time due to this aforementioned frequency offset. An on-time error is a timing error that represents a time difference between a detected transmission path, or a finger, and the actual transmission path.

To combat and correct these on-time errors, base station receivers employ what is called a tracker. In the case where a frequency offset exists between a mobile transmitter and base station RAKE receiver, a finger (e.g., detected propagation path from mobile station transmitter to base station receiver) in the base station receiver experiences a certain adjustment in slew rate. The slew rate can be defined as a finger timing change rate in a chip per radio frame. The slew rate due to the frequency offset is such that an ideal on-time (i.e., ideal finger timing) drifts over time. Thus, a tracker should be able to track the timing drift and maintain on-time error as small as possible.

Accordingly, a tracker is needed for each finger in the RAKE receiver of the base station to track the correct timing of a specific finger. Due to a Doppler effect and due to the above-noted frequency offset between the transmitter and the receiver, the timing of a finger may drift over time. The tracker is supposed to constantly lock on a finger's timing so that most of signal energy in that finger can be utilized by the receiver.

FIG. 1 illustrates a block diagram of a tracker typically used in an IS-95 system, and is referenced to explain a conventional tracker algorithm. In the tracker 100 of FIG. 1, an interpolator 110 receives samples at a rate of 2 samples/chip for each frame of data from sample buffer 105 and, via a filtering action performed in interpolator 110, increases the resolution to output samples of a frame at a rate of 16 samples/chip. These samples collect in a circular buffer 120 until samples for an entire frame of data have been stored in circular buffer 120.

Accordingly, given an on-time value, the tracker 100 reads two samples per chip that are output from the circular buffer 120. One sample, which is called the "early sample", is at a timing of on-time, minus ½ chip period and the other sample (the "late sample") is retrieved at a timing of on-time plus ½ chip period. These samples accumulate in an early accumulator 122 and in a late accumulator 124, respectively as the circular buffer 120 is filling up, wherein samples of an entire frame of data fill circular buffer 120 at a faster rate than the samples that are input into interpolator 110 from sample buffer 105.

Considering a single raised cosine pulse without noise, the early and late samples should have the same magnitude, if the on-time value is at the peak of the pulse. However, if the on-time value is earlier than the peak time, the early sample magnitude should be smaller than the late sample magnitude. Similarly, if the on-time value is later than the peak time, the early sample magnitude should be larger than the late sample magnitude.

Tracker 100 separately calculates metrics of a frame. A metric is an accumulated signal in a frame that is representative of the early or late samples. L2s shown in accumulators 122 and 124 of FIG. 1 represent squared L2 metrics for a corresponding early sample and late sample. For reasons of clarity, demodulation, despreading and unscrambling processes are not shown herein FIG. 1, but are included in the calculations performed at accumulators 122 and 124 in FIG. 1.

A difference (d) between the early and late metrics in a frame is calculated and accumulated in a calculator 130 as a variable D. At the end of each frame, D is compared in a comparator 140 with a fixed threshold value (thresh). If the absolute value of D is larger than thresh, which means the error is significant, a first error correction unit 152 in adjuster 150 performs an error correction by adjusting the on-time error value by plus or minus ¹⁄₁₆ chip period (Tc), depending on the sign (+ or –) of D. A second correction unit 154 reduces the magnitude of D by the threshold value thresh. The adjustments to on-time errors are then fed back from adjuster 150 to both the sample buffer 105 and interpolator 110 for a subsequent data frame.

The IS-95 standard algorithm described above for tracker 100 has been shown to be a very good performer in the field. However, for a system operating according to the third-generation UMTS standard, this design is inadequate for two reasons. First, receivers such as RAKE receivers in a UMTS need to cover a much wider range of signal-to-noise ratios than other communication systems, due to the various data rates supported by the standard. Thus, the expected values of d and D in FIG. 1 apparently increase as signal power increases. Accordingly, the threshold value should also increase as the signal-to-noise ratio increases.

Additionally, the threshold value should be adapted to handle different slot formats and compressed mode patterns, which are design considerations unique to UMTS systems, since all of these factors change the statistical properties of d and D. Therefore, in order to cover all transmission scenarios, a large number of thresholds need to be generated and stored in a lookup table. This process of generating each threshold individually and selecting a threshold on the fly requires a complicated and costly tracker design.

A second problem with the conventional IS-95 tracker is with the accumulation of d, the difference value between early and late metrics. In a UMTS standard, one transmission may include more than one slot format for different frames. If metrics calculated from different slot formats are accumulated together, the thresholds designed for a particular slot format may not work adequately, and tracker performance may therefore degrade significantly.

SUMMARY OF THE INVENTION

To overcome the aforementioned problems, the present invention provides a method and system for tracking and correcting on-time errors of fingers in a CDMA communication system. In the method, a first metric representing a first signal sample and a second metric representing a second signal sample are produced from sample signals of a data frame received in the system. A sum of the first and second metrics and a difference between the first and second metrics are calculated. The sum is used to determine at least one threshold value, and a comparator compares the difference to the calculated threshold value to determine an on-time error for a finger. Based on the determined on-time error, an adjuster adjusts timing for the on-time error, and feeds back the revised on-time value to the buffer. The revised on-time value is then applied to subsequently received data frames.

In an aspect of the invention, two threshold values are dynamically calculated, i.e., in real time. Based on a comparison of the calculated on-time error with one of the dynamic thresholds, and also accounting for the magnitude of the on-time error, a timing adjustment is performed.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

The present invention is applicable, but not limited to, UMTS base station RAKE receivers. For example, the present invention may be adapted to IS-95 standard systems. The method has very low complexity without compromising system performance. Simulations illustrate that the method and system are robust for data frames having different signal-to-noise ratios, and for metrics calculated from multiple and differing slot formats. Additionally, the method employs an adaptive or dynamic threshold technique to accommodate different transmission scenarios.

Figure 2:
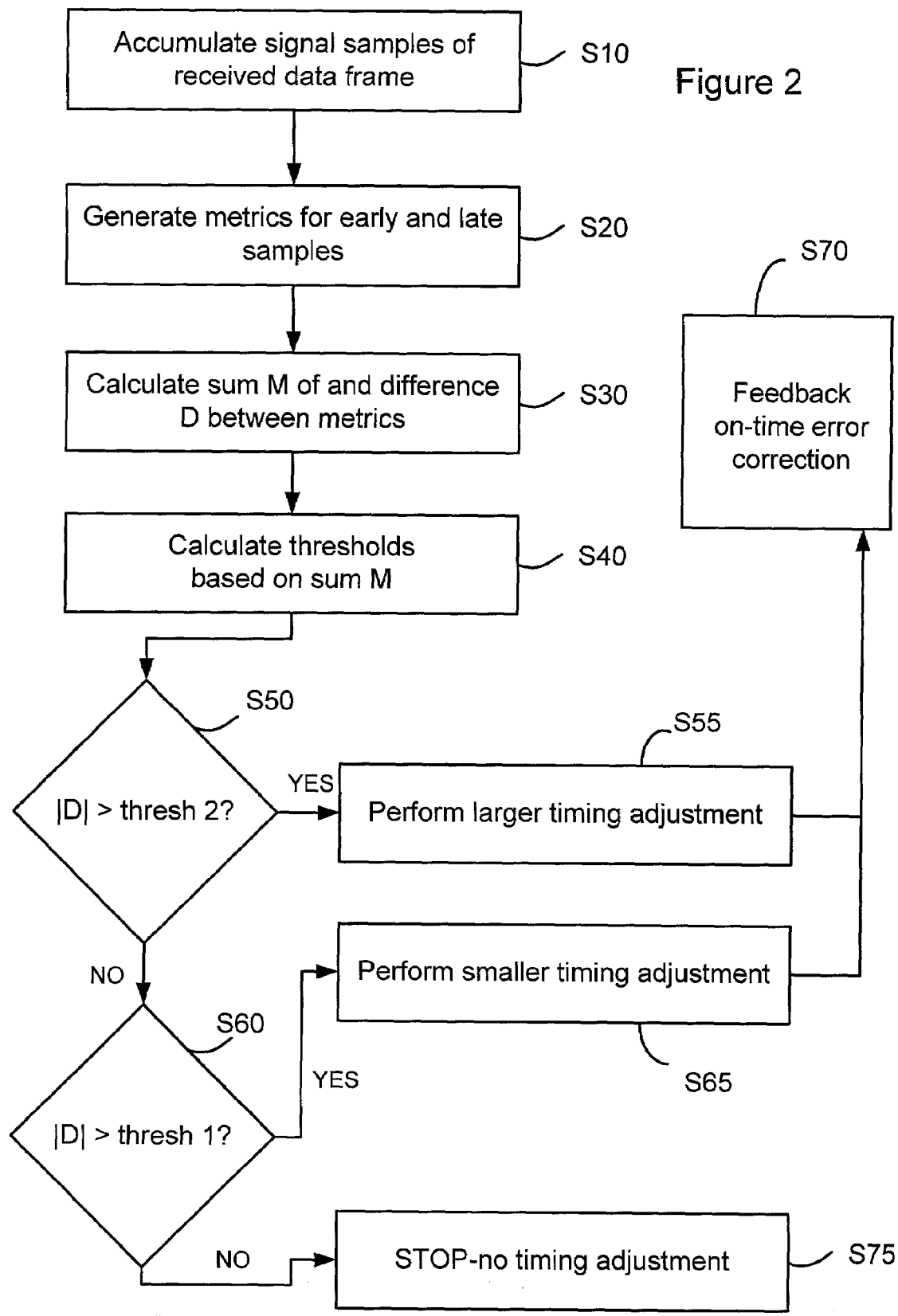
FIG. 2 is a flow diagram illustrating the method in accordance with the invention.

FIG. 2 is a flow diagram illustrating the method in accordance with the invention. In accordance with FIG. 2, a data frame is received in a buffer of a base station RAKE receiver, where a plurality of signal samples that comprise the data frame are accumulated (Step S10). A detector in a tracker of the receiver retrieves certain signal samples from these accumulated samples. In an embodiment that will be described in further detail below, these certain signal samples are represented by a first or early symbol and a second or late symbol. The early and late symbols are generated from despread dedicated physical control channel (DPCCH) samples in a despreader of the receiver. The early symbol is created from samples that are a half chip-time earlier than on-time samples, and the late symbol is created from samples that are a half chip-time later than the on-time samples.

These early and late symbols are accumulated so that the detector can generate metrics (Step S20). The detector generates a first metric representing the early symbols, and hence its corresponding signal samples, and a second metric representing the late symbols and hence its corresponding signal samples.

Based on the generated metrics, a sum (M) of the two metrics and a difference (D) between the two metrics are calculated (Step S30) and output from the detector. Based on the sum M, a calculator in the tracker calculates thresholds (Step S40) that are used for comparison to the difference D, which is representative of the on-time error between the two metrics.

In an embodiment, two thresholds may be calculated, a first threshold (thresh 1) for evaluating smaller on-time errors, and a second threshold (thresh 2) for evaluating larger on-time errors. If the absolute value of D is greater than thresh 2 (YES at Step S50), a larger timing adjustment is made to the on-time error (Step S55). If the absolute value of D is less than thresh 2 (No at Step S50), then the absolute value of D is compared to thresh 1 at Step S60. If the absolute value of D is greater than thresh 1 (YES at Step S60), then a smaller, refined timing adjustment, as will be discussed in detail below, is made (Step S65). In both cases, a timing error control value that represents an on-time error correction is fed back to the buffer for a subsequently received data frame (Step S70). Where the absolute value of D is less than thresh 1 (NO at Step S60), no timing adjustment is made (Step S75) for that data frame.

The tracker of the present invention includes two major parts. The first part is a timing error detector (TED), which accepts inputs of early and late symbols and calculates early and late metrics. Outputs of the TED include the difference and sum of the early and late metrics.

The second part of the tracker performs threshold comparison and timing correction, where TED outputs are compared with thresholds and sub-chip timing corrections to on-time errors are adjusted according to the comparison results. In addition, control and timing of the tracker are particularly important because of the wide varieties of operating modes in UMTS.

The TED generates early and late metrics. Early and late metrics are first calculated over a slot, and then accumulated non-coherently with other slots. Early symbols are defined as complex numbers that represent corresponding signal samples of a data frame received in the detector. Early symbols are input into the TED at a symbol rate. As previously discussed, these symbols are generated from despread DPCCH samples that are a half-chip time earlier than the "on-time" samples, which are samples obtained using the current path delay value of a finger at the receiver.

Likewise, late symbols are created from samples a half-chip later than the on-time samples. Early and late symbols are accumulated separately by coherent or non-coherent accumulation. If a series of continuous symbols in a slot are known a priori, these symbols are demodulated and then coherently accumulated. After that, results of coherent accumulation and symbols not qualified for coherent accumulation are non-coherently accumulated over a slot period.

The accumulation process is better explained in the following example. Assuming that a slot format 2 of a UMTS DPCCH channel is under consideration and Se(1), Se(2) . . . , Se(10) represent early DPCCH symbols in a slot, the metric of this slot is calculated as follows:

$$\left\|\sum_{i=1}^{5} Se(i)\right\|^2 + \left\|\sum_{i=6}^{7} Se(i)\right\|^2 + \|Se(8)\|^2 + \|Se(9)\|^2 + \|Se(10)\|^2. \quad (1)$$

The first five symbols are accumulated coherently because these are pilot channel symbols and have been already demodulated to be in phase with each other. The next two symbols 6 and 7, called Transmit Power Control (TPC) symbols, are not known a priori, but they are always the same by UMTS standard. Therefore, symbols 6 and 7 can be coherently accumulated without demodulation. Because symbols 8 and 9, called Transport Format Combination Indicator (TCFI) symbols and symbol 10 (a Feed Back Information (FBI) symbol) cannot be accumulated coherently with other symbols, the final slot metric is a non-coherent accumulation of Pilot, TPC, TFCI1, TFCI2 and FBI. A metric L2 norm, shown as absolute-squared in equation (1), converts the coherent accumulation results to be ready for non-coherent metric accumulation in the TED. Metrics of different slots are also non-coherently accumulated by a direct sum.

There is an exception regarding the coherent accumulation of pilot channel symbols. The purpose of doing coherent accumulation is to reduce noise power and thus increase signal-to-noise ratio. However in the presence of non-zero Doppler frequencies and frequency offsets, demodulated symbols have intrinsic phase offsets. Thus, signal-to-noise ratio gains obtained from coherent accumulation are compromised. If the sum of Doppler frequency and frequency offset is large, the length of coherent accumulation interval should be shortened to avoid further Signal to Interference Ratio (SIR) loss. In that case, the coherent accumulation interval for pilot channel symbols should be no more than 4 symbols. In other words, if a slot has more than four (4) pilot channel symbols, the TED only coherently accumulates 4 pilot symbols and then non-coherently accumulates the rest of the pilot channel symbols. For the above example, the slot metric is computed by expression (2):

$$\left\|\sum_{i=1}^{4} Se(i)\right\|^2 + \|Se(5)\|^2 + \left\|\sum_{i=6}^{7} Se(i)\right\|^2 + \|Se(8)\|^2 + \|Se(9)\|^2 + \|Se(10)\|^2. \quad (2)$$

Accordingly, when it is time for the tracker to perform a timing adjustment (usually this is at the end of a frame) the TED outputs a sum (M) and a difference (D) of the accumulated early and late metrics, and all accumulators in the TED are then reset to zero for the next round of accumulation (for a next frame, for example). Based on M, two thresholds are dynamically calculated, i.e., calculated in real time. As opposed to selecting thresholds that have been calculated in advance for different conditions, and then stored in a lookup table (LUT); the present invention determines these thresholds in real time, therefore dispensing with the use or necessity of a large or complex LUT. The two threshold values may be computed using the following expression (3):

$$Thresh1=(M-N_F)/8, \text{ and}$$

$$Thresh2=3*Thresh1. \quad (3)$$

In expression (3), $N_F$ is the estimated noise power factor within an entire duration of accumulation, and M is the sum of the early and late metrics. Subtracting $N_F$ from M reduces the bias of M due to the noise factor. The remainder of this operation, i.e., the comparison of D with the thresholds, can be explained using the following pseudo code in expression (4):

If (abs(D)>Thresh2)

On-time-=sign(D)*2/16chip period;

Else if (abs(D)>Thresh1)

On-time-=sign(D)*1/16chip period. (4)

An on-time error adjustment of either 1/16 chip period (for smaller on-time errors) or 2/16 chip period (for larger on-time errors) is realized by setting a front-end sample buffer and interpolator of a RAKE receiver to retrieve samples with the new on-time value.

Figure 1:
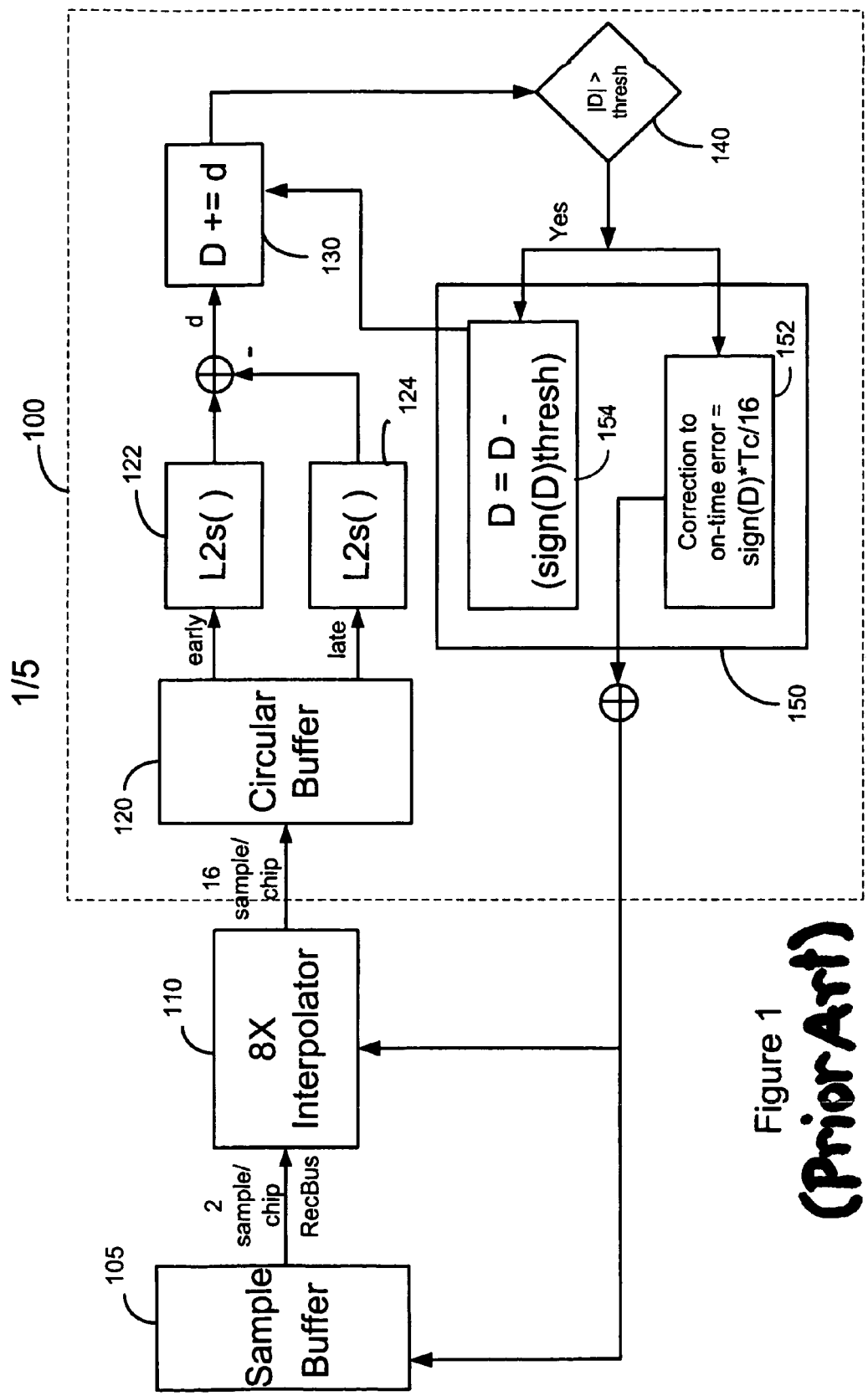
FIG. 1 illustrates a block diagram of a tracker typically used in an IS-95 system.
Figure 3:
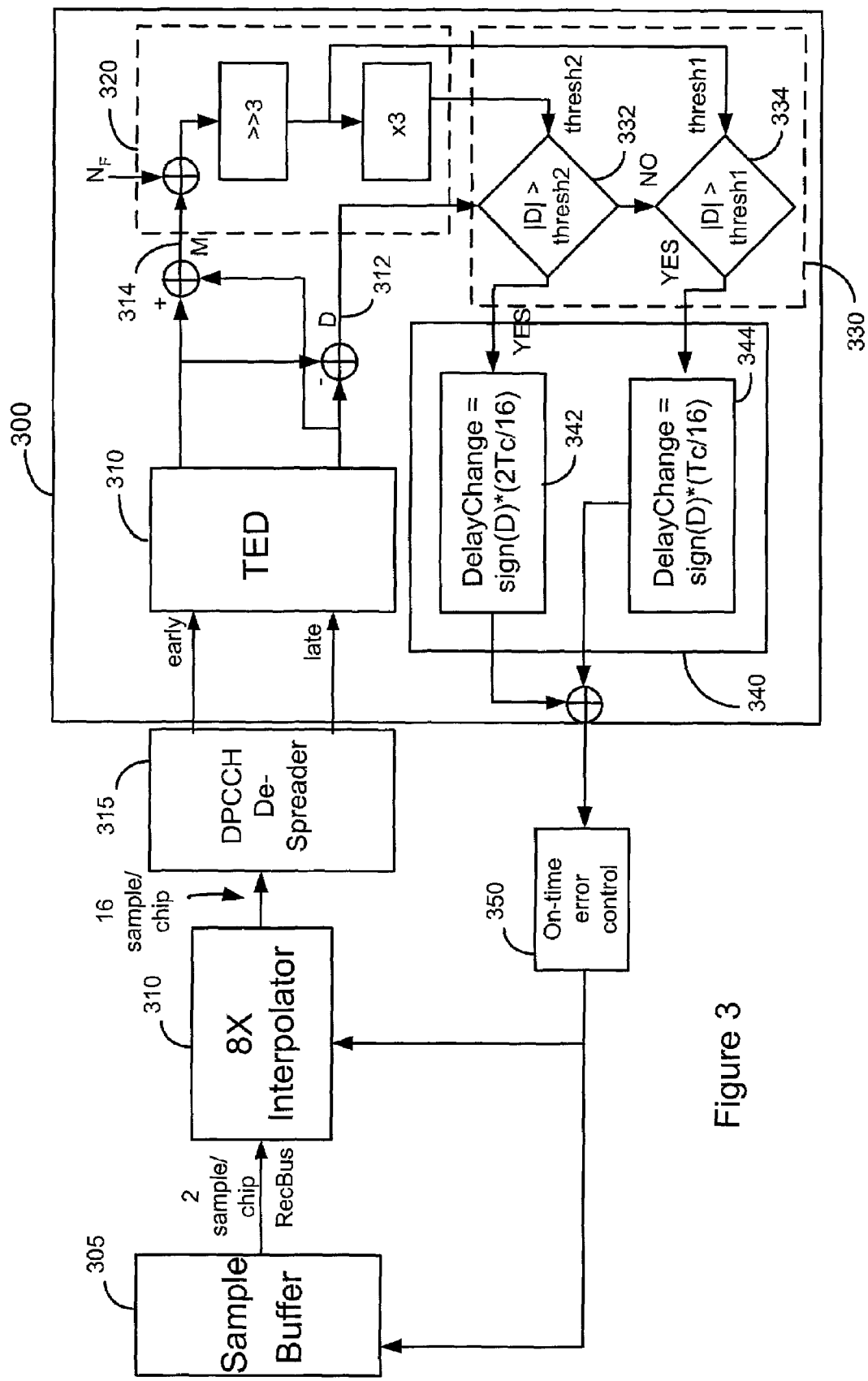
FIG. 3 is a block diagram of an apparatus used to track and correct on-time errors in accordance with the invention.

FIG. 3 is a block diagram of an apparatus used to track and correct on-time errors in accordance with the invention. FIG. 3 illustrates a tracker 300, which in an embodiment is included for each RAKE receiver finger in a base station. Certain elements of FIG. 3 are similar to FIG. 1, thus a detailed discussion of these elements (sample buffer 305 and interpolator 310) is omitted for the sake of brevity.

Referring to FIG. 3, tracker 300 receives early and late symbols from DPCCH despreader 315 at timing error detector (TED) 310. As discussed above, TED 310 calculates early and late metrics. Tracker 300 also includes the aforementioned circular buffer and accumulators (or registers not shown) which are filled with the slot variables as inputs (i.e., the signal samples and early and late symbols), as explained above. The accumulators (not shown) are part of TED 310 and the circular buffer may also be included in TED 310, or operatively connected thereto.

Outputs of the TED 310 include a difference D and a sum M of the early and late metrics. The sum M is used to calculate the real-time thresholds at a calculator 320. The difference D is compared to thresh2 at comparator 330 which receives the calculated thresh2 as an input. Comparator 330 also receives the calculated thresh1 as an input, to be compared with D should the on-time error be small (|D|<thresh2). Based on the results of the comparison(s), sub-chip timing correction to on-time errors is performed in adjuster 340 according to the comparison results.

Since timing control is important for the receiver in the base station, the outputs of adjuster 340, which include any corrections to the on-time error, are fed back to the sample buffer 305 and interpolator 310 for subsequently received frames. Additionally, Threshold$_1$ and Threshold$_2$ are dynamically (i.e., in real-time) updated for each subsequently received data frame.

Simulation Results.

FIGS. 4–7 illustrate simulation results of tracker performance in accordance with the invention. To see the actual tracker performance, on-time RMS errors were simulated under different scenarios. For the simulations, a simulator was set up in C to mimic the actual environment where the tracker would be working. DPCCH symbols were modulated, spread and scrambled by a long scrambling code in the transmitter of the simulator.

One DPDCH (dedicated physical data channel) was transmitted in parallel with a DPCCH channel carrying random information, and was spread by 256 chips per symbol. The chips were then filtered through a pulse-shaping filter, which is a root raise cosine (RRCOS) filter having a 0.22 roll-off rate. This RRCOS FIR filter was six chips long and had eight samples per chip. The channel introduced additive white Gaussian noise (AWGN) with fixed power (thus a given DPCCH carrier signal to noise ratio ($E_c/N_o$) was achieved by adjusting the signal power). When Rayleigh fading was activated, the same channel fading coefficient was applied to a one-chip duration, in order to reduce computation complexity of the simulator.

At the receiver side, the same RRCOS FIR filter was implemented in one polyphase filter to convert the incoming 8 samples/chip data stream into a 16 samples/chip data stream. This is not how an actual receiver front end works, but the simulator provided similar 16 samples/chip data that is required by the tracker. All simulator runs were performed on a slot-by-slot basis.

Only one propagation path was considered in the simulation. The propagation path could be a fading path or a non-fading path, a static path or a moving path. For the following simulation results, frequency offsets were either set to zero, or in a worst case were set such that $$|f_o| = 433.5 \text{ Hz} + 2.008 \frac{\text{Hz}}{\text{km/h}} v \quad (5)$$

where $f_o$ is the frequency offset; and v is the vehicle speed in km per hour. The finger slew rate is derived from the frequency offset as $$\text{slew rate} = \frac{f_o}{2 \cdot 10^9 \text{ Hz}} 3.84 \cdot 10^6 \text{ chip periods/sec.} \quad (6)$$

Given that a UMTS radio frame is 10 ms long, the slew rate can be written as:

$$\text{slew rate} = f_o \cdot 1.92 \cdot 10^{-5} \text{ chip periods/frame.} \quad (7)$$

To reflect a given slew rate in the simulator, an accumulator was set to accumulate the timing drift every one eighth (⅛) of a chip period. When the accumulator reached 1/16 chip period at the end of a slot, a timing offset of one sixteenth chip period was introduced to the next slot. The offset could be either plus or minus depending on the sign of the frequency offset.

The following simulations in FIGS. 4–7 cover DPCCH $E_c/N_o$ ranges from −34 dB to 0 dB, which is sufficient to reveal tracker performance in normal operating conditions.

Figure 4:
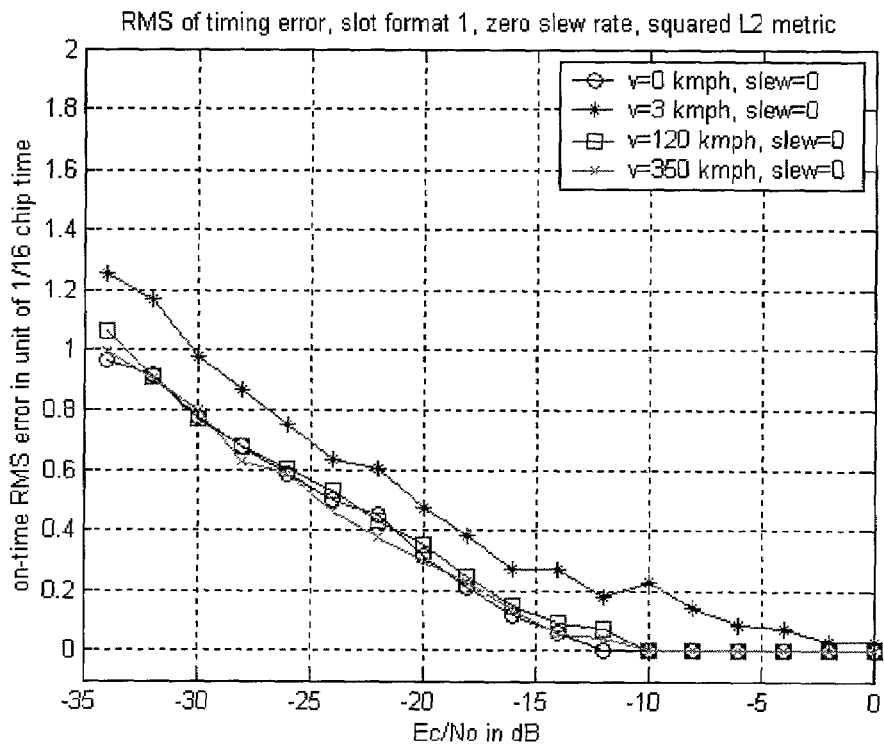
FIGS. 4–7 illustrate simulation results of tracker performance in accordance with the invention.

In the simulation, if the Doppler frequency was higher than 250 Hz, the propagation path was considered as a fast fading path. Otherwise it was considered a slow fading path. All of the simulations started with a zero on-time error, so the initial transient effect was not included in the results. FIG. 4 shows the on-time RMS errors for different vehicle speeds, given zero slew rates. In FIG. 4, slot format 1 of the UMTS standard and squared L2 norm of the UMTS standard are applied. Note that higher RMS errors at low $E_c/N_o$ do not result from improper threshold values, but the higher RMS errors are irreducible due to lower signal power. For vehicle speeds of 0, 120 or 350 km/h, the tracker performed very well in terms of RMS errors. When v=3, higher RMS errors occurred due to slow fading. When fading was very slow, deep fades affected a few consecutive frames and on-time errors can grow over that period of time.

Figure 5:
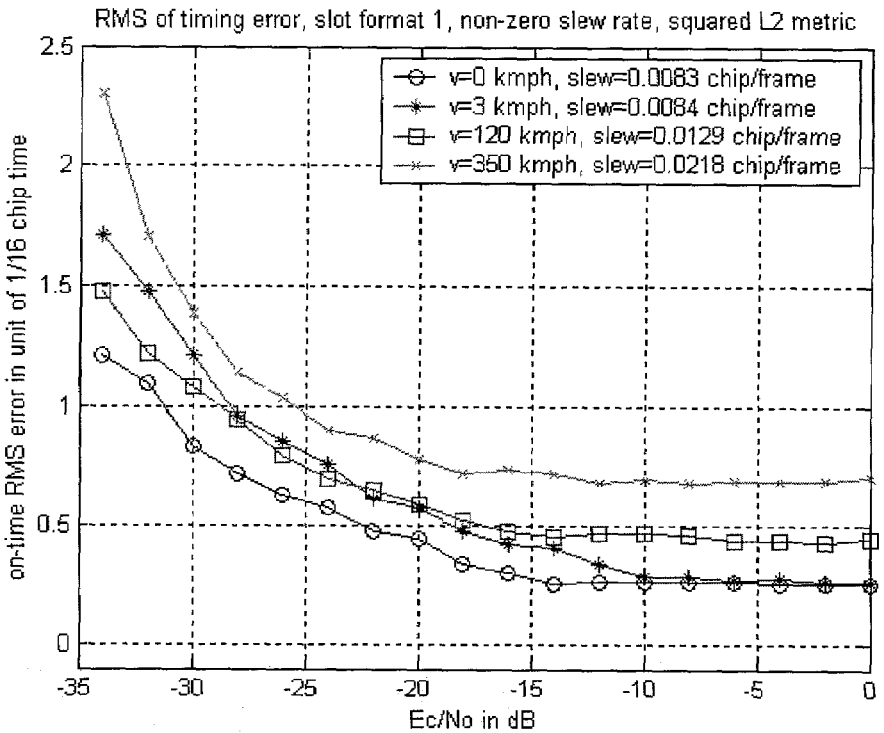

FIG. 5 shows RMS errors with the same setup, but slew rates were calculated by equation (7). On-time RMS errors were apparently larger, but were still controlled within one and a half (1½) sixteenth chip periods for $E_c/N_o$ values larger than −30 dB.

Figure 6:
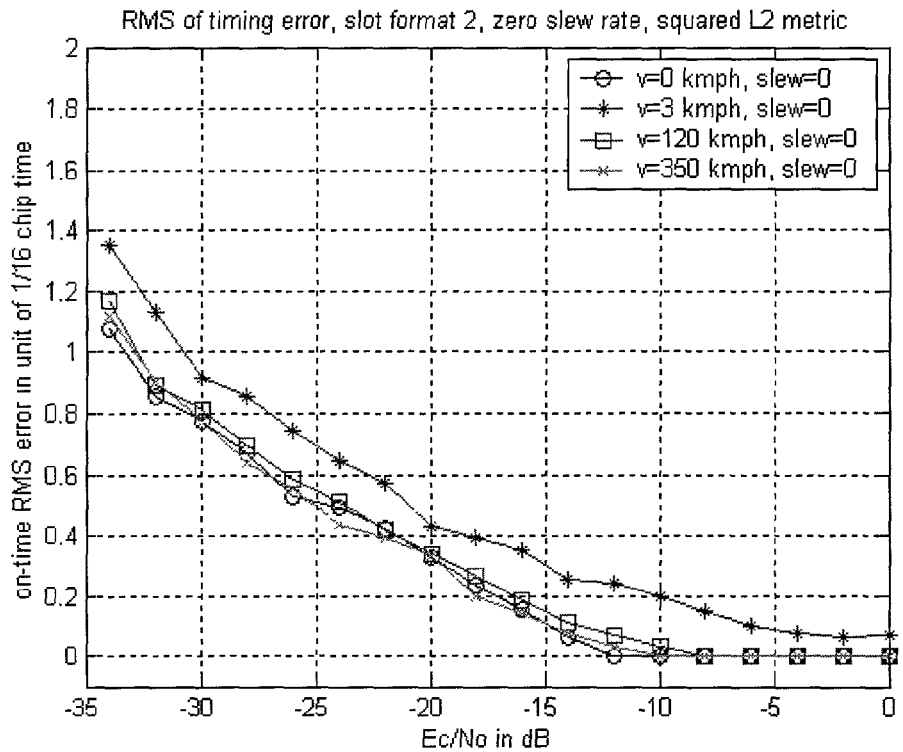
Figure 7:
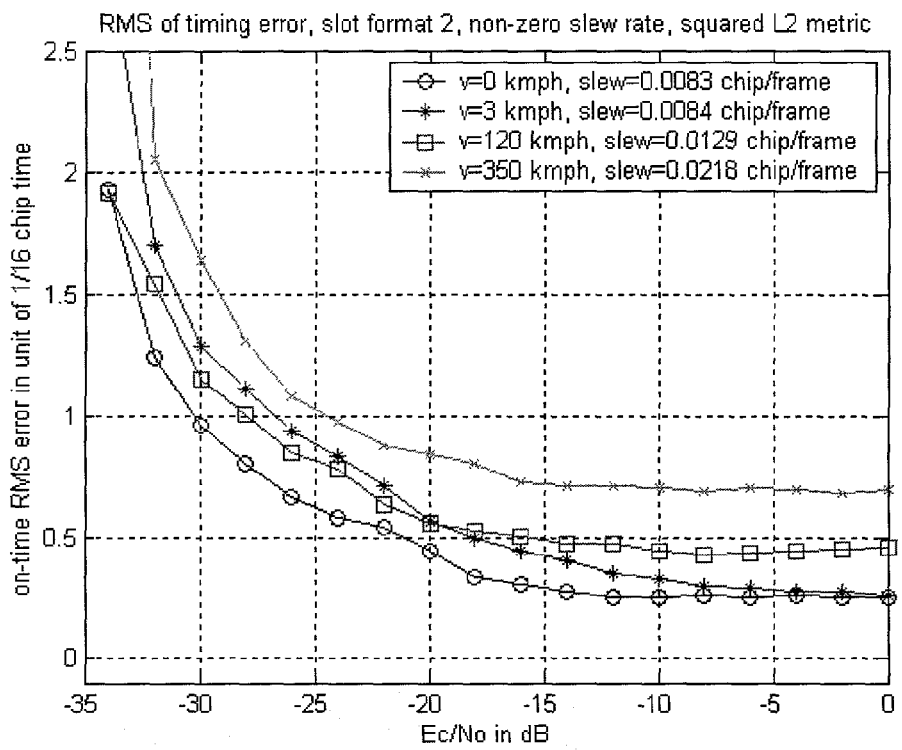

Slot format 2 of the UMTS standard was considered next. While slot format 1 of the UMTS standard had eight pilot symbols, slot format 2 of the UMTS standard has only five pilot symbols, so some performance degradation due to less noise suppression was expected. FIGS. 6 and 7 illustrate on-time RMS errors with and without timing drift. These results were very close to the results for slot format 1, except for the case where slew rates were non-zero and $E_c/N_o$ was low. The results from these figures imply that the tracker in accordance with the invention is indeed quite robust for different slot formats.

The invention being thus described, it will be obvious that the same may be varied in many ways. For example, the functional blocks in FIGS. 1–3 may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s). Such variations are not to be regarded as departure from the spirit and scope of the invention, and all such modifications as would be obvious to one skilled in the art are intended to be included within the scope of the following claims.

What is claimed is:

1. A method of tracking on-time errors in a CDMA communication system, comprising:
   producing first and second metrics from accumulated signal samples of a received data frame;
   calculating a sum of said first and second metrics and a difference between said first and second metrics;
   computing at least one threshold value based on said sum;
   comparing said difference to said at least one threshold value to determine an on-time error for said received data frame, and adjusting timing for said on-time error based on said comparison.

2. The method of claim 1, wherein said adjusting step includes calculating an on-time error correction for subsequently received data frames.

3. The method of claim 1, wherein said first and second signal samples are retrieved at different timings.

4. The method of claim 1, further comprising:
   interpolating said received signal samples to increase a signal sample rate from 2 to 16 samples/chip.

5. The method of claim 1, wherein said retrieving step further includes retrieving an early signal sample and a late signal sample with respect to an on-time sample.

6. The method of claim 1, wherein said producing step produces first and second metrics from despread and accumulated dedicated physical control channel (DPCCH) samples that are a half-chip time earlier and a half-chip time later than on-time samples.

7. The method of claim 1, wherein said computing step calculates a first and a second threshold value in real time for smaller and larger on-time errors contained in each received data frame.

8. The method of claim 7, wherein the computing step calculates the first threshold, thresh1, as thresh1=(M−NF)/8, where M represents the sum of the first and second metrics, and $N_F$ represents a noise power within an entire duration that the signal samples are accumulated.

9. The method of claim 8, wherein the computing step calculates the second threshold, thresh2, as thresh2=3*thresh1.

10. The method of claim 9, wherein the first and second thresholds are dynamically updated for each subsequently received data frame.

11. An apparatus for tracking on-time errors of data frames in a communication system, comprising:
a buffer for accumulating signal samples of a data frame that are received in the system;
a detector for retrieving first and second signal samples at different timings from said accumulated signal samples, for generating a first metric representing said first signal sample and a second metric representing said second signal sample, and for calculating a sum of the first and second metrics and a difference between the first and second metrics;
a calculator for computing at least one threshold value based on said sum;
a comparator for comparing said difference to said at least one threshold value to determine an on-time error for the frame, and
an adjuster for adjusting timing for the on-time error based on the comparison.

12. The apparatus of claim 11, wherein said adjuster calculates an on-time error correction to adjust timing that is effective for subsequently received data frames.

13. The apparatus of claim 12, wherein the on-time error correction calculated by the adjuster is fed back to the buffer for a subsequent data frame.

14. The apparatus of claim 11, wherein the detector retrieves said first and second signal sample at different timings.

15. The apparatus of claim 11, further comprising:
an interpolator that interpolates signal samples received from the buffer to increase sample rate from 2 to 16 signal samples/chip.

16. The apparatus of claim 11, wherein the detector retrieves an early signal sample and a late signal sample, with respect to an on-time sample.

17. The apparatus of claim 11, wherein the detector generates said first and second metrics from despread dedicated physical control channel (DPCCH) samples that are a half-chip time earlier and a half-chip time later than on-time samples.

18. The apparatus of claim 11, wherein the calculator calculates a first threshold value and a second threshold value in real time for smaller and larger on-time errors contained in each received data frame, the first and second threshold values being dynamically updated for each subsequently received data frame.

19. A method of correcting on-time errors of data frames in a communication system, comprising:
generating first and second metrics from despread dedicated physical control channel (DPCCH) samples that are a half-chip time earlier and a half-chip time later than on-time samples of a received data frame;
calculating a first threshold value and a second threshold value in real time, the first and second threshold values to be used in a comparison to smaller and larger on-time errors, respectively, that are contained in each received data frame based on the generated first and second metrics; and
adjusting timing for the on-time error based on the comparison.

20. The method of claim 19, wherein said step of adjusting includes calculating an on-time error correction for subsequently received data frames.

21. The method of claim 20, wherein the calculating step calculates the first threshold, thresh1, as thresh1=(M−$N_F$)/8, where M represents the sum of the first and second metrics, and $N_F$ represents a noise power within an entire duration that the despread dedicated physical control channel (DPCCH) samples are accumulated.

22. The method of claim 21, wherein the calculating step calculates the second threshold, thresh2, as thresh2=3*thresh1.

23. The method of claim 19, wherein the first and second threshold values are dynamically updated for each subsequently received data frame.

24. A tracker for correcting on-time errors in a communication system, comprising:
a detector for retrieving first and second signal samples at different timings from signal samples of a data frame that are accumulated in a buffer, for generating a first metric representing said first signal sample and a second metric representing said second signal sample, and for calculating a sum of the first and second metrics and a difference between the first and second metrics;
a calculator for computing at least one threshold value based on said sum;
a comparator for comparing said difference to said at least one threshold value to determine an on-time error for the frame, and
an adjuster for adjusting timing for the on-time error based on the comparison.

25. The tracker of claim 24, wherein the detector generates said first and second metrics from despread dedicated physical control channel (DPCCH) samples that are a half-chip time earlier and a half-chip time later than on-time samples.

26. The tracker of claim 24, wherein the calculator calculates a first threshold value and a second threshold value in real time for smaller and larger on-time errors, respectively, that are contained in each received data frame, the first and second threshold values being dynamically updated for each subsequently received data frame.

* * * * *